Patented Jan. 15, 1946

2,392,863

UNITED STATES PATENT OFFICE 2,392,863

ASPHALT PREPARATION

Kenneth H. Rudd, Cleveland Heights, Ohio, assignor to The Standard Oil Company, Cleveland, Ohio, a corporation of Ohio No Drawing. Application November 20, 1940, Serial No. 366,436

1 Claim. (Cl. 106—123)

The adhesiveness of asphalt to stone, while fairly satisfactory for some uses, leaves much to be desired in many respects. I have now found that by treatment of asphaltic materials as detailed more fully hereinafter, the adhesiveness may be very markedly improved.

To the accomplishment of the foregoing and related ends, the invention, then comprises the features hereinafter fully described, and particularly pointed out in the claim, the following description setting forth in detail certain illustrative embodiments of the invention, these being indicative however, of but a few of the various ways in which the principle of the invention may be employed.

Asphaltic material is compounded with a small amount of liquid acids, i. e. rosin acids and fatty acids, such as for instance "tall oil," the mixtures of acids obtained as by-products in the pulping of pine wood etc. Various preparations are obtainable commercially, one well known for instance being "liqro." Chemically these preparations consist of fatty acids on the average around 45-55 per cent, rosin acids on the average around 40-45 per cent, higher alcohols, sterols etc. on the average around 6-10 per cent. In general, the iodine number runs around 150-180, the acid number 150-160, rosin acids number 76-82, saponification number 160-170. And, the pour point in general is not over about 45° F., the viscosity Saybolt Universal at 210° F. around 110-130 sec., the specific gravity about 0.96-0.98, the flash point around 350-370° F., and the fire point around 410-430° F. It is thus seen that the material is wholly distinct, and not to be confused with rosin or abietic acid or with wood rosin. Peculiar characteristics are apparently due to the natural mixture of the higher alcohols and sterols and fatty acids and closed chain rosin acids. The amount incorporated with the asphaltic material may be for instance 0.75 to 5 per cent, based on the asphaltic material. Increasing the amount results in production of thicker films on mixing with or applying to stone, and mixing with wet stone is facilitated. The liquid rosin acids and fatty acids may be incorporated with the asphaltic material at different stages of the preparation of the latter, as desired in any instance. Thus it may be incorporated in pipe still bottoms which are to be oxidized to asphalt, or it may be incorporated with a partially oxidized asphalt and the oxidation then be completed to desired amount, or it may be incorporated with finished asphalt of a desired consistency, or it may be incorporated with naphtha which in turn is mixed with asphalt. The asphalt spreads easily and adheres with great tenacity to dusty or wet surfaces of paving materials, roofings, walls or wherever applied. A desirable procedure is to incorporate the liquid rosin acids and fatty acids in the raw material or partly oxidized asphalt and then complete the air blowing or oxidation.

The present product, tested by the methods of the A. S. T. M., vol. 39, pages 1140-1149, applying the asphaltic composition to limestone, allowing to set for twenty-four hours, and then subjecting to boiling for ten minutes, showed for instance a 100 per cent coating intact after such test. In contrast, a commercial high grade asphalt subjected to the same test lost 50 per cent of the coating.

Other modes of applying the principle of the invention may be employed, change being made as regards the details described, provided the features stated in the following claim, or the equivalent of such, be employed.

I therefore particularly point out and distinctly claim as my invention:

A composition of matter comprising asphaltic material as the primary ingredient thereof in which is incorporated tall oil in an amount not in excess of 5%, based on the asphaltic material, as an ingredient to impart enhanced properties to said composition of adhering with tenacity to wet stone surfaces.

KENNETH H. RUDD.